United States Patent [19]

Bauer

[11] Patent Number: 5,421,118
[45] Date of Patent: Jun. 6, 1995

[54] LAWN EDGING SYSTEM

[76] Inventor: Kirk W. Bauer, 14818 N. Jennifer Ct., Mead, Wash. 99021

[21] Appl. No.: 171,612

[22] Filed: Dec. 20, 1993

[51] Int. Cl.$^6$ .............................................. A01G 1/00
[52] U.S. Cl. ...................................... 47/33; 52/102; 52/387; 404/6
[58] Field of Search ............... 47/33; 52/102, 387; 404/37, 6

[56] References Cited

U.S. PATENT DOCUMENTS

| | | | |
|---|---|---|---|
| 318,126 | 5/1885 | Marsh | 52/387 |
| 421,742 | 2/1890 | Marsh | 52/387 |
| 1,454,293 | 5/1923 | Liptak | 52/387 |
| 1,954,424 | 6/1934 | Otwell | 47/9 |
| 2,193,425 | 4/1940 | Lake | 52/102 |
| 3,520,095 | 7/1970 | Jonason | 52/387 |
| 3,740,913 | 6/1973 | Musser | 52/387 |
| 3,916,563 | 11/1975 | Tedesh | 52/102 |
| 3,964,224 | 6/1976 | Christensen | 52/387 |
| 4,125,964 | 7/1978 | Waggoner | 47/33 |
| 4,135,338 | 1/1979 | Malavasi | 52/387 |
| 4,671,699 | 11/1987 | Roach | 47/33 |
| 4,907,909 | 3/1990 | Ruckstuhl | 404/37 |
| 5,006,011 | 4/1991 | Hiyashi | 404/37 |
| 5,121,569 | 4/1992 | Thomas | 47/33 |
| 5,240,343 | 2/1993 | Strobl, Jr. | 404/7 |

OTHER PUBLICATIONS

Snap Edge Brochure, "Plastic Edge Restraint for Concrete Pavers and Patio Slabs," Date Unknown.
Permaloc Brochure, "Structure Edge," Date Unknown.
CXT Brochure, "Create Your Grand Design One Interlocking Paver At A Time," Date Unknown.
Valleyview Specialties Co. Brochure, "Diamond-Lok," Date Unknown.
Pave Tech Inc. Brochure, "Pave Edge," Date Unknown.
Pisa Brochure, "Interlocking Retaining Wall Systems," Date Unknown.

Primary Examiner—Henry E. Raduazo
Attorney, Agent, or Firm—Wells, St. John, Roberts, Gregory & Matkin

[57] ABSTRACT

A lawn edging system is described for positioning a row of edge blocks over underlying soil along a lawn or planter edge. The edging system includes an elongated restraining channel having opposed sidewalls extending continuously along its length. The sidewalls are transversely spaced from each other to receive and hold a row of edge blocks alongside a lawn edge. The elongated channel has a floor which is formed of a plurality of spaced floor leaves extending across the elongated channel. The sidewalls can be severed and bent, between the floor leaves. This allows the elongated channel to be bent to conform to curved lawn edges. The edge blocks are tapered so that they can be aligned in straight and curved rows. A plurality of perforated anchoring tabs extend outward from along the first sidewall of the elongated channel to allow grass roots to grow therethrough and to thereby secure the elongated channel and received edge blocks relative to the underlying soil.

19 Claims, 5 Drawing Sheets

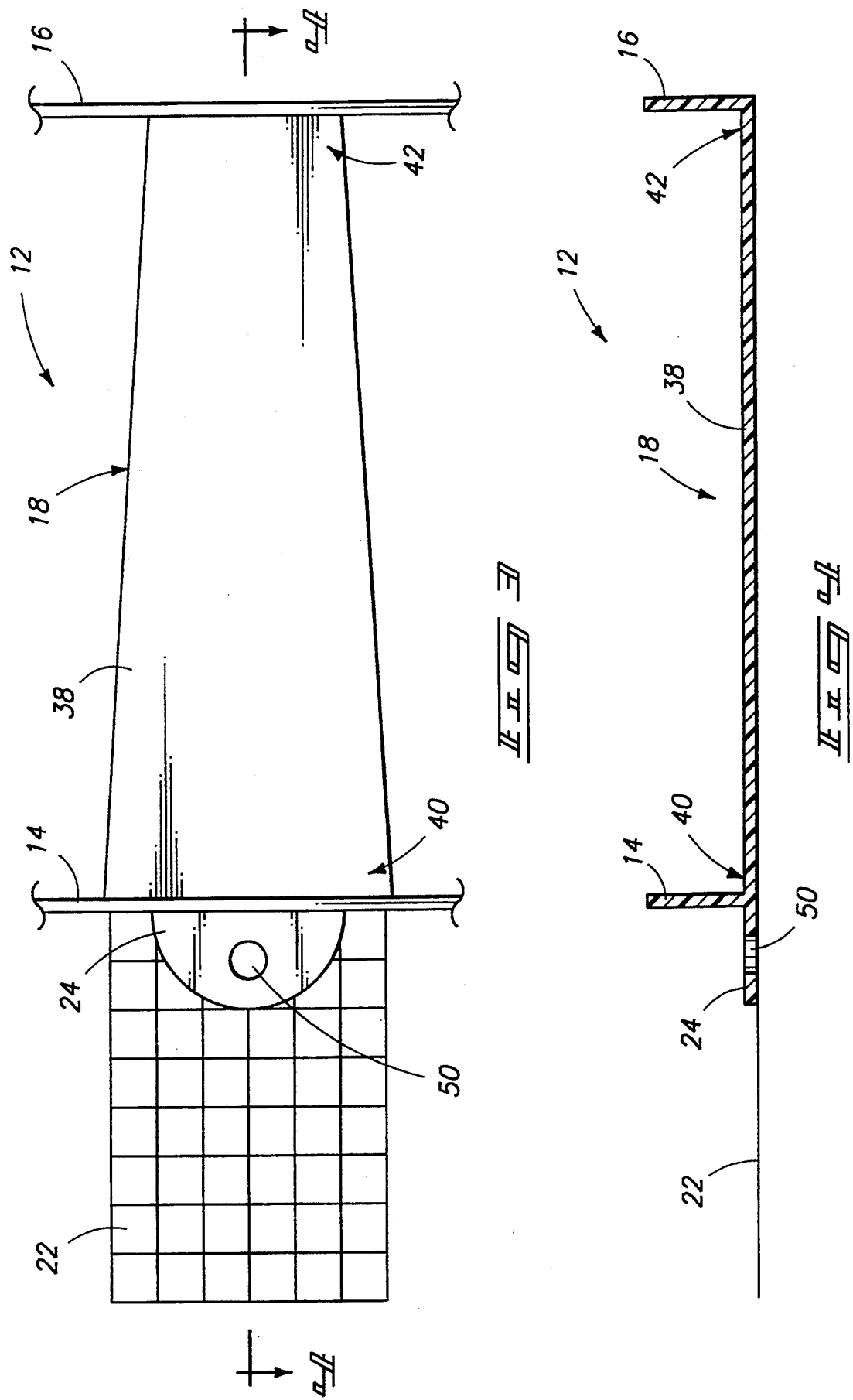

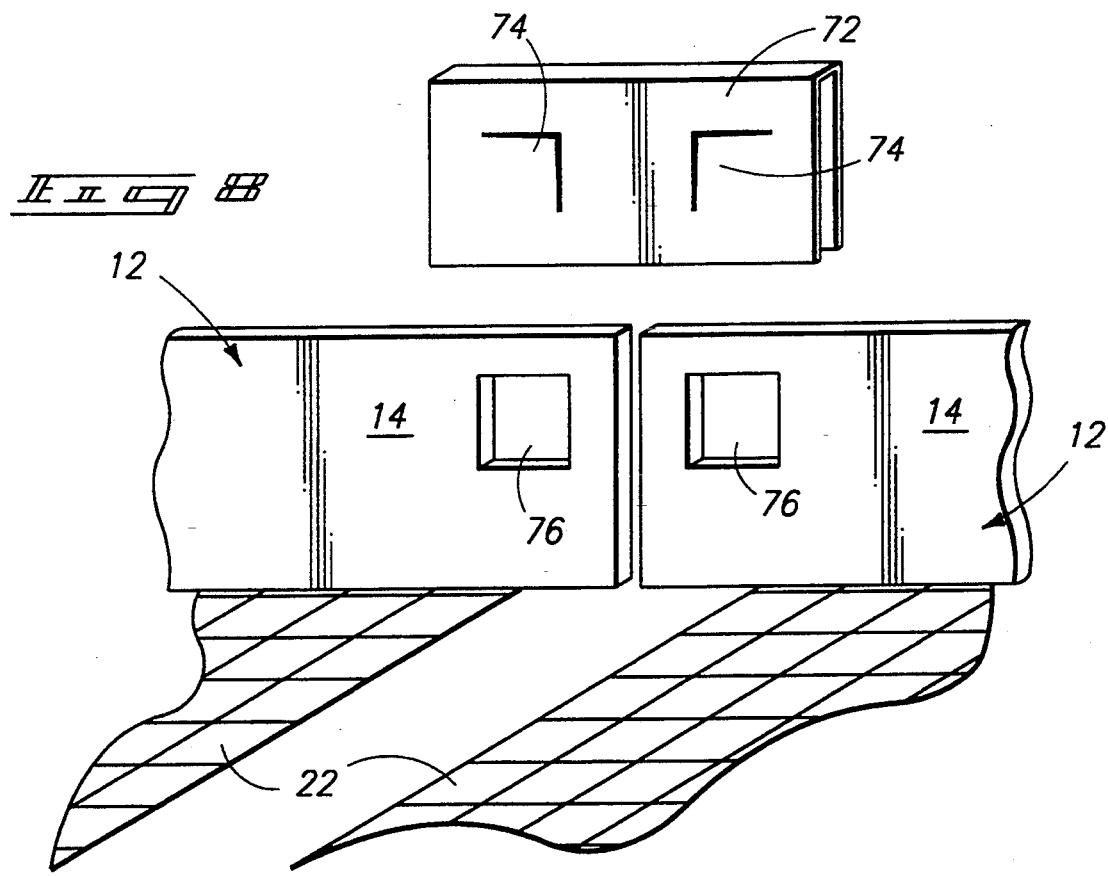
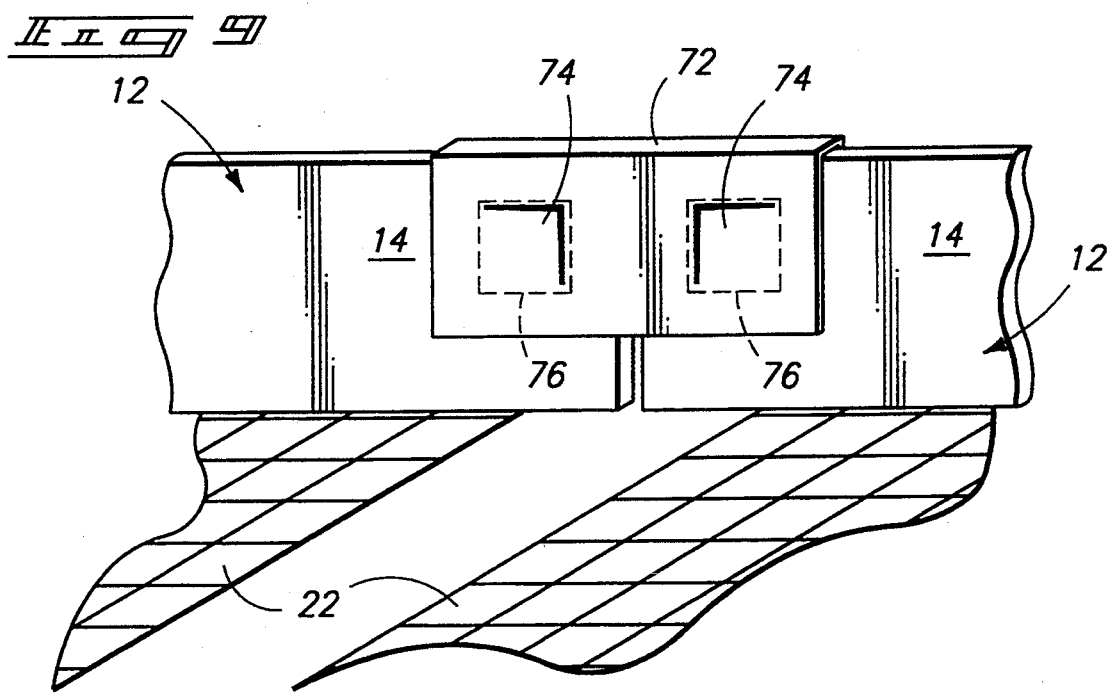

LAWN EDGING SYSTEM

TECHNICAL FIELD

This invention relates to lawn edging devices which hold and position edging blocks.

BACKGROUND OF THE INVENTION

Various edging devices have been used in attempts to define permanent grass boundaries in lawns. Such edging devices are intended to serve one or more of three general functions. Their primary purpose is to resist the encroachment of grass into flower beds or other areas where grass is not desired. In addition, some types of edging devices provide a solid surface, at grass level, for lawnmower wheels. This can be a significant convenience. Finally, some edging devices are considered to be ornamental, improving the appearance of a lawn and garden.

Elongated wood pieces or strips such as two-by-fours or railroad ties are often used as edging devices. In the case of two-by-fours, they are generally anchored or retained by stakes. Railroad ties are usually retained solely by their own weight. The primary advantage of wood is low cost. Depending upon the width of material used, wood edging devices also provide a surface for lawnmower wheels. However, untreated wood tends to rot and decay. Furthermore, wood edging devices tend to loosen and move. Many wood edging systems thus need replacement or re-setting after several years.

Thin strips or plates of metal or plastic are also used as lawn edging. The material of these devices tends to last longer than wood. However, such devices generally provide no support for lawnmower wheels. In fact, after repeated mowings the weight and movement of a lawnmower over such metal or plastic strips can tend to move or dislodge them from their desired location. Furthermore, thin strips are simply not substantial enough separate materials from each other. For instance, grass often grows right over the top of thin strips, sometimes dislodging or loosening them in the process. Bark and rock are also easily thrown from one side to the other of thin strips. Another disadvantage of these edging devices is that they provide no ornamental function.

A continuously-poured curb-like concrete edge is an alternative to the above devices. It is becoming increasingly popular. A poured concrete edge tends to be more solid and permanent than the devices described above. In addition, it provides a solid edge surface for lawn mowing and is considered by many to be aesthetically pleasing. The primary disadvantage of concrete edging systems is their high cost. Another disadvantage is that ground heaving from seasonal ground freezing and thawing can result in cracking. Ground heaving can even, in some cases, dislodge or move poured concrete edges.

Discrete concrete blocks are sometimes used instead of continuously-poured concrete edges. Blocks are lower in cost and can be easily installed by a home-owner, while possessing several of the advantages of continuously-poured concrete edges. For instance, concrete blocks are aesthetically pleasing and provide a convenient surface for lawnmowers. A significant disadvantage of discrete concrete blocks, however, is their relative instability. Ground heaving and vegetation growth tend to dislodge concrete blocks from their initial aligned positions. Foot traffic and lawnmower wheels can also shift such blocks—especially in wet conditions where the underlying ground is soft.

The invention described below is an edging system which exploits the advantages of discrete concrete blocks. However, the resulting concrete block lawn edge also has the advantage of poured concrete edges. The disadvantages of more conventional concrete block edging systems are avoided by positioning and restraining the blocks in such a way as to resist their movement and migration. A concrete block lawn edge in accordance with the invention is significantly less expensive than a poured concrete lawn edge and only slightly more expensive than a lawn edge formed by a conventional installation of discrete concrete blocks.

BRIEF DESCRIPTION OF THE DRAWINGS

FIG. 3 is a top view of a segment of an edge block restraining channel such as the one shown in FIG. 1.

FIG. 4 is a sectional side view taken along the line 4—4 of FIG. 3.

FIG. 5, however, shows the lawn edging system in an outwardly-curved configuration.

FIG. 6, however, shows the lawn edging system in an inwardly-curved configuration.

FIG. 8 is an exploded isometric side view showing a connector for connecting two adjacent restraining channels.

FIG. 9 is an isometric side view similar to FIG. 8, except that the connector is installed between the two adjacent restraining channels.

DETAILED DESCRIPTION OF THE PREFERRED EMBODIMENT

This disclosure of the invention is submitted in furtherance of the constitutional purposes of the U.S. Patent Laws "to promote the progress of science and useful arts." U.S. Constitution, Article 1, Section 8.

Figure 1:
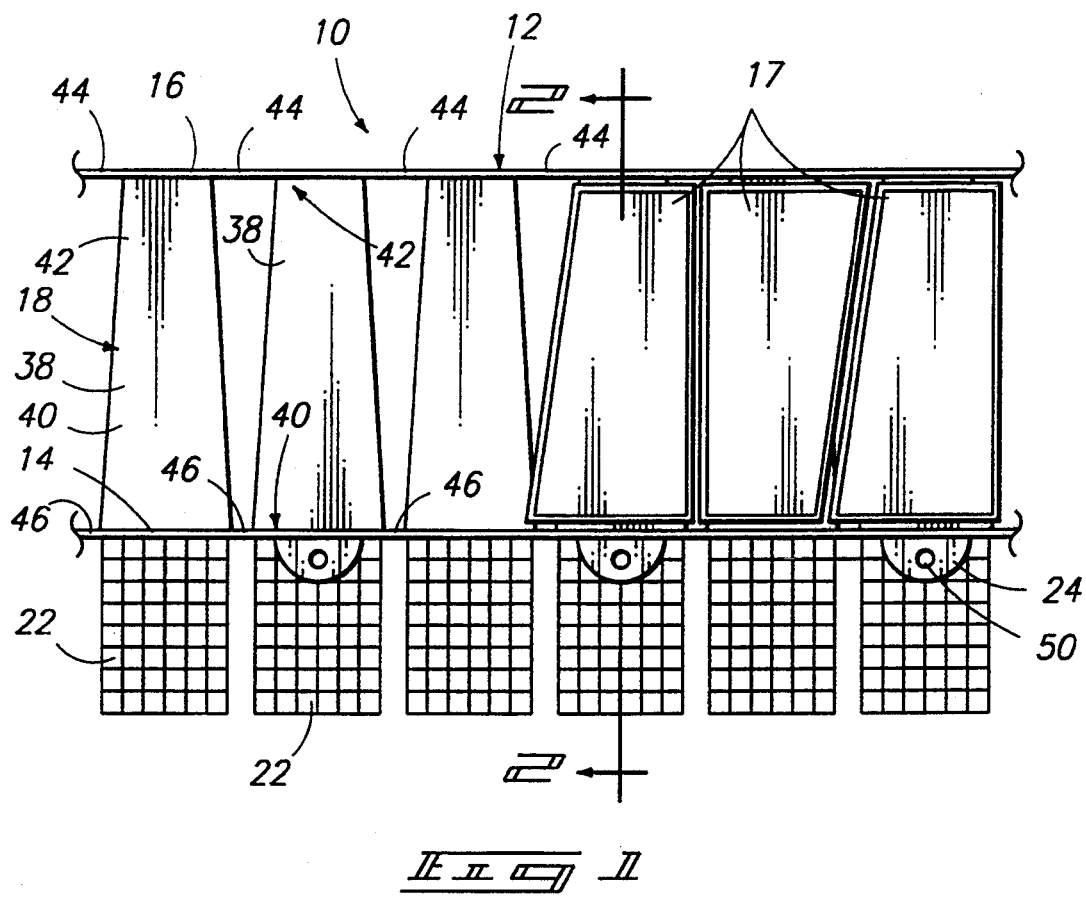
FIG. 1 is a top view of a lawn edging system in accordance with a preferred embodiment of the invention. The edging system includes a restraining channel which receives a single row of concrete edge blocks. For purposes of illustration, only three such concrete edge block are shown.

FIG. 1 shows a lawn edging system in accordance with a preferred embodiment of the invention, generally designated by the reference numeral 10. The general function of edging system 10 is to position a single row of edge blocks over underlying soil along a lawn or planter edge.

Edging system 10 comprises an elongated restraining channel 12 having a first or inner sidewall 14 and an opposed second or outer sidewall 16. The sidewalls are transversely spaced from each other to receive and hold a plurality of edge blocks 17 therebetween. Channel 12 includes a channel floor 18 which extends between sidewalls 14 and 16 to support channel 12 over underlying soil at a sub-surface elevation. Edging system 10 also includes anchoring tabs or means for securing the elongated channel relative to the underlying soil. In the preferred embodiment described herein, the anchoring tabs include a plurality of perforated tabs 22 and a plurality of peg tabs 24.

Figure 2:
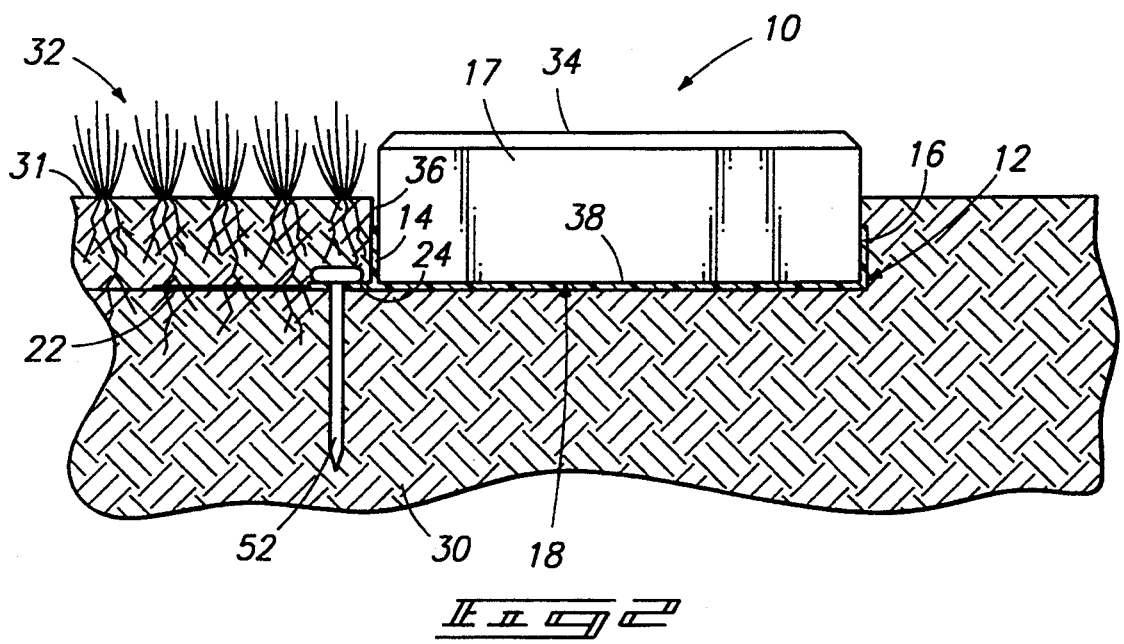
FIG. 2 is a sectional side view of the lawn edging system of FIG. 1. The illustrated edging system is installed along a lawn edge.

As shown in FIG. 2, channel 12 is installed atop underlying soil 30 beneath an upper surface 31 of an adjoining lawn grass or sod area 32. A single row of edge blocks 17 is received between sidewalls 14 and 16 of restraining channel 12. Edge blocks 17 have upper surfaces 34 which are positioned slightly above upper surface 31 of lawn grass area 32. Perforated tabs 22 and peg tabs 24 extend laterally outward from channel 12 beneath lawn grass area 32 to positively secure edging system 10 relative to the underlying soil 30 and lawn grass area 32. Elongated channel 12 holds and restrains the row of edge blocks relative to the underlying soil to define a lawn edge 36 along the edge blocks.

Referring now to FIGS. 1, 3, and 4, sidewalls 14 and 16 extend continuously along the length of channel 12. Channel floor 18 comprises a plurality of floor leaves 38. Each floor leaf 38 extends from a first, wide end 40 at inner sidewall 14 to a second, narrow end 42 at outer sidewall 16. First end 40 of each floor leaf 38 is wider than second end 42 of the same floor leaf 38. More specifically, each floor leaf 38 has a width which tapers from first end 40 to second end 42. This creates roughly triangular spaces between adjacent floor leaves, with the second ends of the floor leaves being spaced by a greater distance from each other than the first ends of the floor leaves.

At least a portion of channel 12 is bendable upon severing selected sidewall portions. This allows the restraining channel to be conformed to or bent along a curved lawn edge. More specifically, floor leaf second ends 42 define a plurality of severable portions 44 in outer sidewall 16 between second ends 42 of adjacent floor leaves 38. These portions can be severed so that at least a portion of channel 12 is bendable. First ends 40 of floor leaves 38 define a plurality of bendable portions 46 in inner sidewall 14 between first ends 40 of adjacent floor leaves 38.

Figure 5:
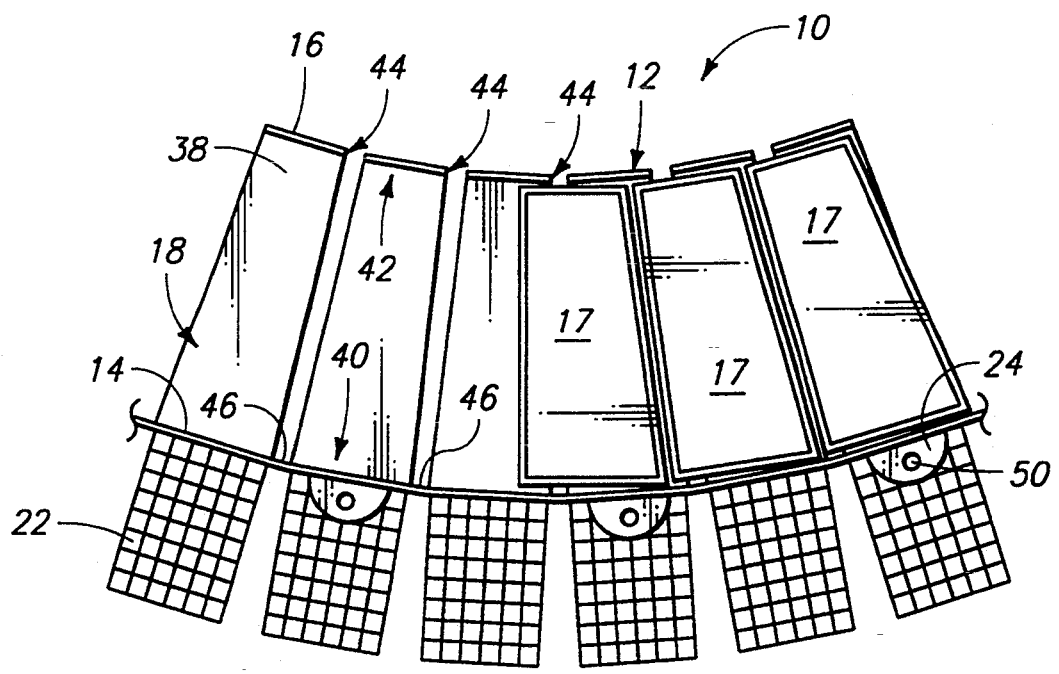
FIG. 5 is a top view of a lawn edging system such as the one shown in FIG. 1.
Figure 6:
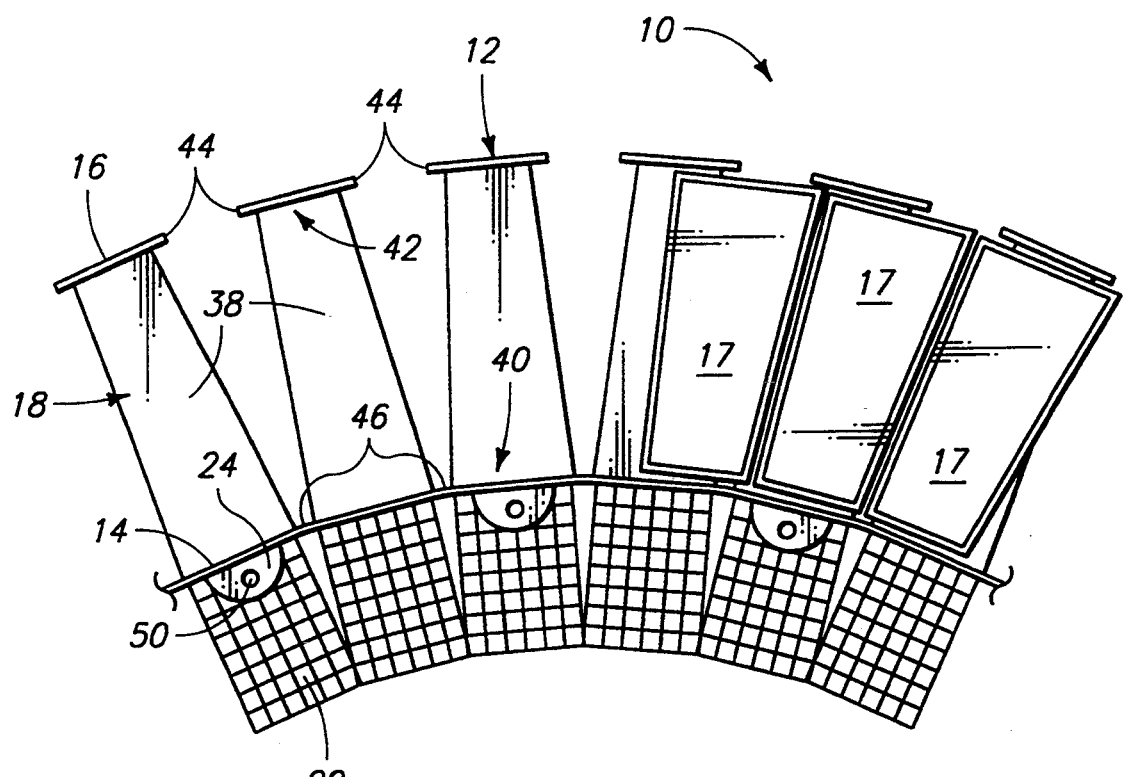
FIG. 6 is a top view of a lawn edging system such as the one shown in FIG. 1.

FIGS. 5 and 6 show channel 12 in bent or curved configurations. As illustrated, severable portions 44 of outer sidewall 16 are cut or removed between selected floor leaves 38. This allows the entire channel to be bent along inner sidewall 14. FIG. 5 shows an outwardly-curved configuration in which second ends 42 of floor leaves 38 converge toward each other and toward a common center. Spaced second ends 42 of floor leaves 38 and bendable portions 46 of inner sidewall 14 allow the channel to be bent in this manner. The actual bending of the channel occurs at discrete points along inner sidewall 14, specifically at bendable portions 46.

The channel can be bent only after severing outer sidewall 16 at its severable portions, corresponding to the portions between second ends 42 of floor leaves 38. In some cases, as illustrated in FIG. 5, it may be desirable to actually remove the entire severable portions between floor leaf second ends 42. However, in other cases it may be sufficient to simply provide single cuts in outer sidewall 16 between floor leaf second ends 42. This would leave overlapping sidewall segments when using the outwardly-curved configuration of FIG. 5.

FIG. 6 shows an inwardly-curved configuration in which second ends 42 of floor leaves 38 diverge away each other. In this configuration, first ends 40 converge toward a common center. Again, the actual bending of the channel occurs at bendable portions 46 of inner sidewall 14 and is made possible by cutting outer sidewall 16 between adjacent floor leaves.

Elongated channel 12 is preferably formed integrally from injection molded plastic in discrete lengths of from six to eight feet. The particular material chosen must be relatively rigid in order to securely restrain received edge blocks. However, it must also be sufficiently flexible to allow bending along inner sidewall 14. The particular configuration of the floor leaves and anchoring tabs facilitates this bending, while also allowing rigidity where needed. Particularly, inner sidewall 14 is reinforced against bending by floor leaves 38 along portions of sidewall 14 which intersect first ends 40 of floor leaves 38. Bending between first ends 40 is normally prevented by the integral structure of floor leaves 38 and sidewalls 14 and 16. However, severing outer sidewall 16 between floor leaves 38 eliminates the reinforcing nature of this integral structure. After such severing, bending of inner sidewall 14 is prevented only by the intersections of floor leaf first ends 40 and inner sidewall 14. However, the spacing of floor leaves 38 leaves unreinforced gaps in inner sidewall 14. These un-reinforced gaps are easily bent when outer sidewall 16 is severed between floor leaves.

Perforated tabs 22 and peg tabs 24 are positioned and spaced so that they do not interfere with the bending of inner sidewall 14. Thus, they are longitudinally positioned along channel 12 to extend transversely outward only from portions of inner sidewall 14 which also intersect floor leaves 38. Neither perforated tabs 22 nor peg tabs 24 intersect inner sidewall 14 along the bendable portions of sidewall 14.

Each of peg tabs 24 has an aperture 50. A peg 52 (FIG. 1) is received through each aperture 50. Pegs 52 can be used as needed during initial installation to secure channel 12 relative to the underlying soil. Peg tabs 24 are preferably flat plastic extensions or flaps which are integrally formed with elongated channel 12. Their primary purpose is to provide receptacles or fittings for receiving a series of anchoring pegs such as peg 52. Peg tabs are spaced at periodic intervals along channel 12. Each peg tab 24 is preferably positioned to extend from between adjacent bendable portions 46 of inner sidewall 14 so that it will not interfere with the bending of inner sidewall 14.

Perforated tabs 22 are also preferably integrally formed with channel 12. They are spaced from each other, as described above, to leave gaps coinciding with bendable portions 46 of inner sidewall 14. Specifically, each perforated tab 22 is positioned to extend laterally from between adjacent bendable portions 46 of inner sidewall 14. This ensures that inner sidewall 14 will be free to bend at its bendable portions 46.

Perforated tabs 22 extend, when channel 12 is installed, laterally beneath lawn area 32 as shown in FIG. 2. In installations where grass is planted on one side of channel 12, grass roots grow downward through tabs 22. It has been found that such root growth is effective to securely position and retain channel 12 relative to the underlying soil and that this type of anchoring is more effective than using pegs or spikes alone. Thus, in many cases the pegs of the present embodiment are used primarily for initial positioning and retention, until grass roots grow through the perforated tabs.

The perforations in anchoring tabs 22 can be rectangular, circular, or any other shape, with preferable diameters or cross dimensions of approximately one sixteenth of an inch. The perforations are preferably spaced as closely as possible to give maximum opportunity for roots to pass through the anchoring tabs. While the preferred embodiment perforated tabs are formed of plastic, integrally with channel 12, other types of materials such as wire mesh could be used and appropriately fastened to channel 12.

Figure 7:
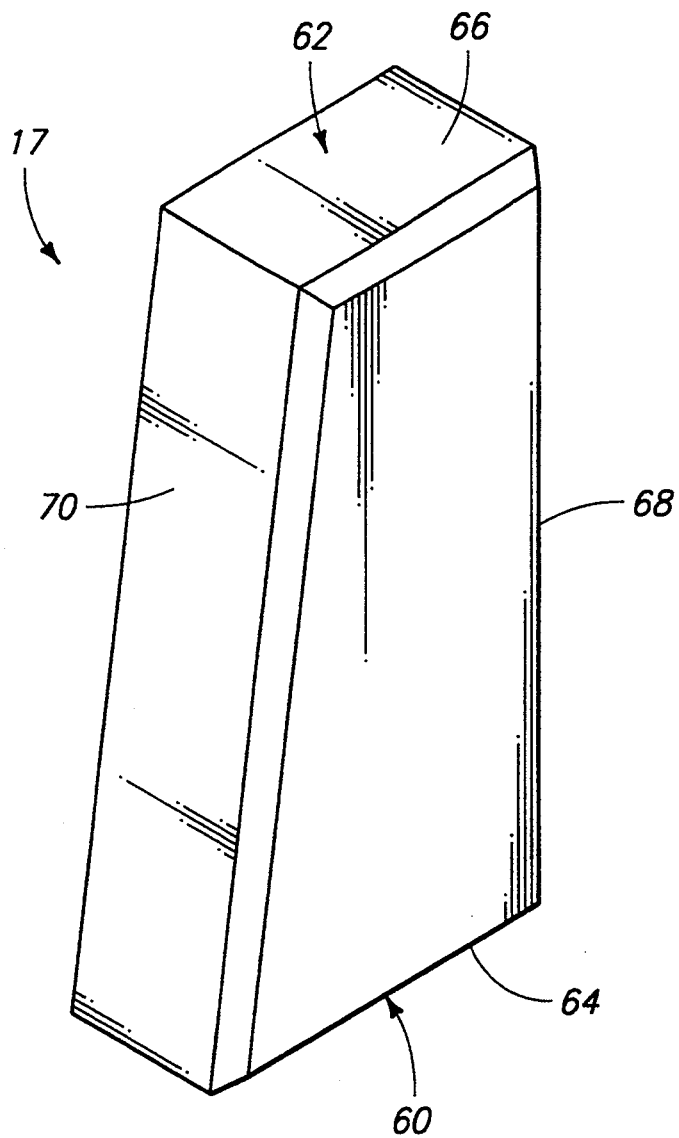
FIG. 7 is an isometric top view of a tapered concrete edge block in accordance with a preferred embodiment of the invention.

Although many types of concrete blocks could be advantageously used with the retaining channel described above, the edging system described herein is particularly advantageous when used in combination with concrete edge blocks 17 as illustrated in FIG. 7. Viewed from the top, each edge block 17 has a wide end 60 and a narrow end 62. The block sides 64 and 66 formed by ends 60 and 62 are parallel with each other. A first longitudinal side 68 extends along edge block 17 between ends 60 and 62. A second longitudinal side 70 extends along edge block 17 opposite first longitudinal side 68. First longitudinal side 68 is at right angles to block sides 64 and 66. However, second longitudinal side 70 angles inward as it approaches narrow end 62 of edge block 17. Thus, edge block 17 has a tapering width. First longitudinal side 68 is square and second longitudinal side 70 is angled.

This shape allows blocks 17 to be aligned in straight or curved rows and in combinations of straight and curved sections. Fig. 1 shows blocks 17 aligned in pairs to form a straight row. In this arrangement, the angled side 70 of each selected block abuts the angled side 70 of the adjacent block, and the square side 68 of the selected block abuts the square side 68 of another adjacent block. Alternatively stated, the blocks are alternately aligned in opposite orientations relative to elongated channel 12 to form a straight row. Each adjacent block has its narrow end 62 oriented oppositely from its neighboring block.

In the curved configurations of FIGS. 5 and 6, each subsequent block is identically aligned, with its narrow end 62 oriented identically to that of its neighboring block. The angled side 70 of each selected block abuts the square side 68 of the adjacent block, and the square side 68 of the selected block abuts the angled side 70 of another adjacent block. The blocks are preferably angled to provide a radius of approximately three feet.

The sequence can be varied to produce curves of different radii. Furthermore, curved row segments can be interspersed with straight row segments and visa versa. Serpentine rows can be created in this fashion. In addition, rectangular blocks, not shown, can be used and interspersed with angled blocks.

In the preferred embodiment shown, the crosswise dimensions of the blocks are selected to establish a block pitch, when the blocks are laid in a straight row, which is equal to the pitch of floor leaves 38 along channel 12. More generally, it is convenient to select component dimensions so that the pitch of the floor leaves is an integral multiple of the blocks when the blocks are laid in a straight row. Nevertheless, blocks having different pitches can also be used.

FIGS. 8 and 9 show connection means for connecting or securing two adjacent restraining channels 12 to each other. Said connection means comprises a U-shaped clip 72 having an internal gap which is complementary to the thickness of sidewalls 14 and 16. To connect adjacent channels 12, clip 72 is simply pushed over the sidewalls of the channels at their abutment. Clip 12 is preferably fabricated from sheet metal. It has two retaining tabs 74 on each of its sides. Tabs 74 are made by cutting the clip to form triangular portions which are bent inward. Square holes 76 are formed in the ends of the sidewalls of channels 12 to receive retaining tabs 74. Tabs 74 spring outward to allow installation of the clips, and then press into holes 76 to prevent removal of the clips.

Installation of the lawn edging system described above is similar to installing a conventional lawn edge using discrete concrete blocks. However, the restraining channel is placed beneath the edge blocks during installation. Appropriate sections of the restraining channel outer sidewall are severed during the placement process to allow the restraining channel to be bent along the desired path. In an existing lawn, the adjoining grass sod must be pulled back prior to placing the restraining channel. This allows the anchoring tabs to be positioned beneath the grass. Pegs or spikes are used for initially anchoring the channel. However, the pegs are typically installed only after the restraining channel has been adjusted to conform to the path of the received edge blocks.

In an existing lawn, the grass sod is then placed back over the anchoring tabs, against the inner sidewall of the restraining channel. Soil is backfilled against the outer sidewall of the restraining channel. In a new lawn, soil is backfilled against both sidewalls of the restraining channel and grass is planted adjacent the inner sidewall.

The invention described creates a lawn edge which is a significant improvement over the prior art. It possesses many of the advantages of a poured concrete lawn edge. Particularly, the resulting lawn edge is extremely stable due to the restraining influence of the elongated channel. It is also attractive, resulting in a brick-like appearance in which several different colors can be used. Furthermore, the lawn edging system described above provides a wide and solid surface for a lawnmower along the outer periphery of a yard. In contrast to poured concrete, however, the preferred embodiment of the invention is extremely simple and inexpensive to install. While poured concrete edges typically require professional installation and specialized equipment, the lawn edge described above can be easily installed by a homeowner with common household tools.

In compliance with the statute, the invention has been described in language more or less specific as to structural features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A lawn edging system for positioning a row of edge blocks over underlying; soil along a lawn or planter edge, the edging system comprising:

an elongated channel having first and second opposed sidewalls along its length, the sidewalls being transversely spaced from each other to receive and hold the row of edge blocks therebetween;

a severable portion in one of the sidewalls and at least one cut in said severable portion enabling said elongated channel to be bent along the length thereof;

a plurality of anchoring tabs extending transversely outward from along the elongated channel to secure the elongated channel relative to the underlying soil.

2. A lawn edging system as recited in claim 1, wherein the other one of said sidewalls extends continuously along the length of the elongated channel.

3. A lawn edging system as recited in claim 1, wherein one of the sidewalls has a plurality of severable portions.

4. A lawn edging system as recited in claim 1, wherein the anchoring tabs are perforated to allow grass roots to grow therethrough.

5. A lawn edging system as recited in claim 1, further comprising:
a plurality of spaced floor leaves extending across the elongated channel, each floor leaf extending from a first end at the first sidewall to a second end at the second sidewall;
the first ends of the floor leaves defining a plurality of bendable portions in the first sidewall between the first ends of adjacent floor leaves;
the second ends of the floor leaves defining a plurality of severable portions in the second sidewall between the second ends of adjacent floor leaves.

6. A lawn edging system as recited in claim 5, wherein each anchoring tab is positioned along the first sidewall between adjacent bendable portions of the first sidewall.

7. A lawn edging system as recited in claim 1, further comprising a plurality of edge blocks received within the elongated channel, each edge block having a tapering width, wherein the edge blocks can be aligned relative to each other within the elongated channel to form straight and curved rows of edge blocks along a lawn edge, the elongated channel being bendable to conform to the straight and curved rows of edge blocks.

8. A lawn edging system for positioning a row of edge blocks over underlying soil along a lawn or planter edge, the edging system comprising:
an elongated channel having first and second opposed sidewalls along its length, the sidewalls being transversely spaced from each other to receive and hold the row of edge blocks therebetween, the elongated channel having a floor which extends between the sidewalls to support the elongated channel over the underlying soil at a sub-surface elevation;
the channel floor being formed of a plurality of floor leaves extending across the elongated channel, each floor leaf extending from a first end at the first sidewall to a second end at the second sidewall;
a plurality of anchoring tabs extending transversely outward from along one of the sidewalls to secure the elongated channel relative to the underlying soil;
one of the sidewalls having severable portions between adjacent floor leaves, at least a portion of the elongated channel being bendable upon severing one or more of the severable portions for conforming the elongated channel to a curved lawn edge and;
a cut formed in one of the severable portions, and a bend along the channel length.

9. A lawn edging system as recited in claim 8, wherein the anchoring tabs are perforated to allow grass roots to grow therethrough.

10. A lawn edging system as recited in claim 8, wherein the second ends of the floor leaves are spaced from each other, the severable portions being formed in the second sidewall between the spaced second ends of the floor leaves, the spaced second ends of the floor leaves allowing the elongated channel to bend along its first sidewall when the severable portions of the second sidewall are severed.

11. A lawn edging system as recited in claim 8, the first ends of the floor leaves defining a plurality of bendable portions in the first sidewall between the first ends of adjacent floor leaves.

12. A lawn edging system as recited in claim 8, the first ends of the floor leaves defining a plurality of bendable portions in the first sidewall between the first ends of adjacent floor leaves, wherein each anchoring tab is positioned along the first sidewall between adjacent bendable portions of the first sidewall.

13. A lawn edging system as recited in claim 8, further comprising a plurality of edge blocks received within the elongated channel, each edge block having a tapering width, wherein the edge blocks can be aligned relative to each other within the elongated channel to form straight and curved rows of edge blocks along a lawn edge.

14. A lawn edging system as recited in claim 8, wherein:
each floor leaf has a width which tapers from its first end to its second end;
the floor leaves define a plurality of bendable portions in the first sidewall between the first ends of adjacent floor leaves;
the severable portions are formed in the second sidewall between the second ends of adjacent floor leaves; and
the anchoring tabs extend outward from along the first sidewall of the elongated channel, each anchoring tab being positioned between adjacent bendable portions of the first sidewall.

15. A lawn edging system for positioning a row of edge blocks over underlying soil along a lawn or planter edge, the edging system comprising:
an elongated channel having first and second opposed sidewalls extending continuously along its length, the sidewalls being transversely spaced from each other to receive and hold the row of edge blocks therebetween, the elongated channel having a floor which extends between the sidewalls to support the elongated channel over the underlying soil at a sub-surface elevation;
the channel floor being formed of a plurality of spaced floor leaves extending across the elongated channel, each floor leaf extending from a first end at the first sidewall to a second end at the second sidewall, each floor leaf having a width which tapers from its first end to its second end;
the first ends of the floor leaves defining a plurality of bendable portions in the first sidewall between the first ends of adjacent floor leaves;
the second ends of the floor leaves defining a plurality of severable portions in the second sidewall between the second ends of adjacent floor leaves;
a plurality of perforated anchoring tabs extending outward from along the first sidewall of the elongated channel to allow grass roots to grow therethrough, each perforated anchoring tab being positioned 24 between adjacent bendable portions of the first sidewall;
wherein at least a portion of the elongated channel is bendable along the first sidewall upon severing one or more of the severable portions of the second sidewall for conforming the elongated channel to a curved lawn edge.

16. A lawn edging system as recited in claim 15, further comprising a plurality of edge blocks received within the elongated channel, each edge block having a tapering width, wherein the edge blocks can be aligned relative to each other within the elongated channel to form straight and curved rows of edge blocks along a lawn edge.

17. A lawn edging system as recited in claim 15, further comprising a plurality of edge blocks having tapering widths, the edge blocks being aligned in identical orientations relative to the elongated channel to form a curved row of edge blocks along a lawn edge.

18. A lawn edging system as recited in claim 15, further comprising a plurality of edge blocks having tapering widths, the edge blocks being alternately aligned in opposite orientations relative to the elongated channel to form a straight row of edge blocks along a lawn edge.

19. A lawn edging system as recited in claim 15, further comprising a plurality of peg tabs extending outward from along the first sidewall of the elongated channel, each peg tab having an aperture for receiving a peg therethrough and for thereby securing the elongated channel relative to the underlying soil, each peg tab being positioned between adjacent bendable portions of the first sidewall.

* * * * *